US011618475B2

(12) United States Patent
Hiramatsu et al.

(10) Patent No.: US 11,618,475 B2
(45) Date of Patent: Apr. 4, 2023

(54) DRIVING SUPPORT METHOD AND DRIVING SUPPORT DEVICE

(71) Applicants: Nissan Motor Co., Ltd., Yokohama (JP); Renault S.A.S., Boulogne-Billancourt (FR)

(72) Inventors: Machiko Hiramatsu, Kanagawa (JP); Tomohiro Yamamura, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 217 days.

(21) Appl. No.: 17/256,269

(22) PCT Filed: Jul. 4, 2018

(86) PCT No.: PCT/IB2018/000950
§ 371 (c)(1),
(2) Date: Dec. 28, 2020

(87) PCT Pub. No.: WO2020/008227
PCT Pub. Date: Jan. 9, 2020

(65) Prior Publication Data
US 2021/0261162 A1 Aug. 26, 2021

(51) Int. Cl.
*B60W 60/00* (2020.01)
*B60W 30/18* (2012.01)
(Continued)

(52) U.S. Cl.
CPC .. *B60W 60/0016* (2020.02); *B60W 30/18159* (2020.02); *B60W 40/04* (2013.01);
(Continued)

(58) Field of Classification Search
CPC ....... B60W 60/0016; B60W 30/18159; B60W 40/04; B60W 40/06; B60W 60/0027;
(Continued)

(56) References Cited

U.S. PATENT DOCUMENTS

| 10,083,605 B2* | 9/2018 | Sendhoff | B60W 50/08 |
| 2008/0312832 A1* | 12/2008 | Greene | G08G 1/166 |
| | | | 701/301 |

(Continued)

FOREIGN PATENT DOCUMENTS

| JP | 2011-096105 A | 5/2011 |
| JP | 2012-14629 A | 1/2012 |

(Continued)

OTHER PUBLICATIONS

"A Robust Algorithm for Handling Moving Traffic in Urban Scenarios" 2008 IEEE Intelligent Vehicles Symposium Eindhoven University of Technology Eindhoven, The Netherlands, Jun. 4-6, 2008 (Year: 2008).*

*Primary Examiner* — Peter D Nolan
*Assistant Examiner* — Tanya C Sienko
(74) *Attorney, Agent, or Firm* — Young Basile Hanlon & MacFarlane, P.C.

(57) ABSTRACT

A driving support method supports driving of a host-vehicle in a traveling scene in which a host-vehicle track on which the host-vehicle travels and a first other vehicle track on which a first other vehicle travels intersect with each other at an intersecting point. Whether the host-vehicle can enter the intersecting point is determined based on a shielding time during which a second other vehicle shields the first other vehicle track to the intersecting point and a required entry time from when the host-vehicle starts entering the intersecting point to when the host-vehicle finishes entering the intersecting point.

12 Claims, 7 Drawing Sheets

(51) Int. Cl.
*B60W 40/04* (2006.01)
*B60W 40/06* (2012.01)
*G06V 20/58* (2022.01)

(52) U.S. Cl.
CPC ........ *B60W 40/06* (2013.01); *B60W 60/0027* (2020.02); *G06V 20/584* (2022.01); *B60W 2554/4041* (2020.02); *B60W 2554/4049* (2020.02); *B60W 2554/80* (2020.02)

(58) Field of Classification Search
CPC . B60W 2554/4041; B60W 2554/4049; B60W 2554/80
See application file for complete search history.

(56) References Cited

U.S. PATENT DOCUMENTS

| | | | |
|---|---|---|---|
| 2012/0218093 | A1 | 8/2012 | Yoshizawa et al. |
| 2018/0173240 | A1* | 6/2018 | Fang .................... G05D 1/0221 |
| 2018/0218600 | A1 | 8/2018 | Fujita |
| 2019/0077402 | A1* | 3/2019 | Kim ...................... B60W 30/12 |
| 2019/0193727 | A1 | 6/2019 | Noda et al. |
| 2019/0286160 | A1* | 9/2019 | Toda ..................... G05D 1/0214 |
| 2019/0308618 | A1* | 10/2019 | Kondo ................. B60W 30/09 |
| 2020/0282997 | A1* | 9/2020 | Ueda ................... B60W 10/20 |
| 2022/0073091 | A1* | 3/2022 | Emura ............ B60W 30/18154 |

FOREIGN PATENT DOCUMENTS

| | | |
|---|---|---|
| WO | 2017/013748 A1 | 1/2017 |
| WO | 2018/002984 A1 | 1/2018 |

\* cited by examiner

DRIVING SUPPORT METHOD AND DRIVING SUPPORT DEVICE

TECHNICAL FIELD

The present invention relates to a driving support method and a driving support device.

BACKGROUND

A driving support device that performs a driving support serving as a standard for a host-vehicle to travel is known (see Japanese Unexamined Patent Application Publication No. 2011-96105). Japanese Unexamined Patent Application Publication No. 2011-96105 discloses a case where the host-vehicle travels by a driving behavior according to a normative driving behavior candidate (a normative behavior candidate) of the host-vehicle relative to a surrounding environment of the host-vehicle, and also discloses predicting of a risk of contact between the host-vehicle and another vehicle in that case and the determination of a normative behavior of the host-vehicle based on a prediction result.

SUMMARY

Japanese Unexamined Patent Application Publication No. 2011-96105 determines a risk of contact with all other vehicles predicted from a currently detected surrounding environment. Accordingly, as the number of other vehicle increases, the amount of information to be processed increases further, and a time required until determining the normative behavior of the host-vehicle becomes longer. Therefore, a problem is caused in which the driving support of the host-vehicle is delayed.

The present invention is made in view of the above described problem, and an object of the present invention is to provide a driving support method and a driving support device that can reduce the amount of information to be processed and can suppress delays in a driving support of a host-vehicle.

A first aspect of the present invention provides a driving support method for supporting driving of a host-vehicle in a traveling scene in which a host-vehicle track on which the host-vehicle travels and a first other vehicle track on which a first other vehicle travels intersect with each other at an intersecting point, the driving support method including: determining whether the host-vehicle can enter the intersecting point based on a shielding time during which a second other vehicle shields the first other vehicle track to the intersecting point and a required entry time from when the host-vehicle starts entering the intersecting point to when the host-vehicle finishes entering the intersecting point.

According to one aspect of the present invention, it is possible to reduce the amount of information to be processed and suppress delays in the driving support of the host-vehicle.

DETAILED DESCRIPTION

Figure 1:
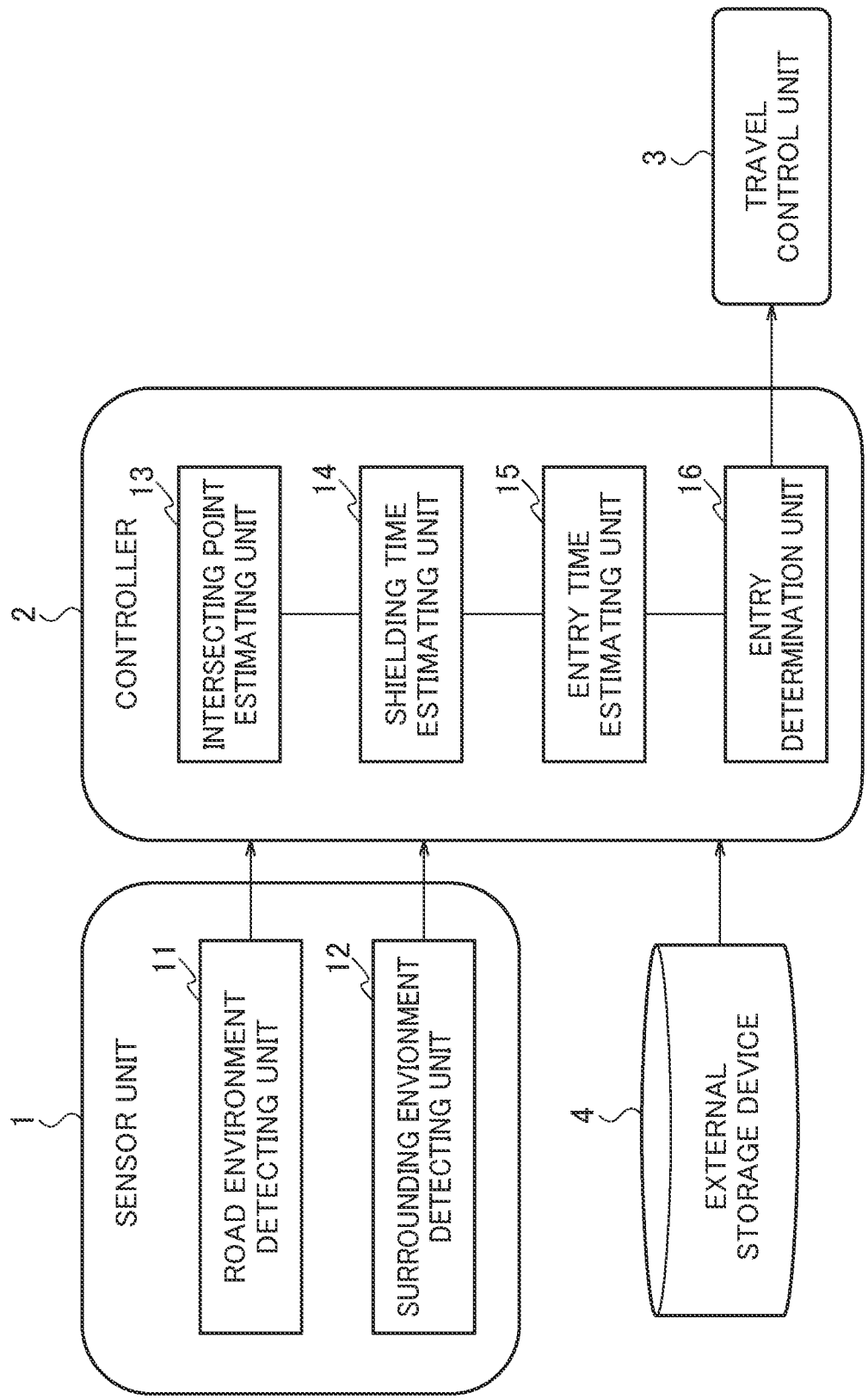
FIG. 1 is a block diagram illustrating a constitution of a driving support device according to a first embodiment.

Embodiments are described with reference to the accompanying drawings. In the illustration of the drawings, the same parts are denoted with the same reference numerals, and therefore, the description thereof is omitted.

First Embodiment

A driving support device according to a first embodiment is a device for supporting driving of a host-vehicle, and in a traveling scene illustrated in, FIG. 4A to FIG. 4E, FIG. 5A, and FIG. 5B, the driving support device supports driving of a host-vehicle 20, for example. That is, the driving support device assumes a traveling scene in which a host-vehicle track 30 on which the host-vehicle 20 travels and a first other vehicle track (31, and 31a to 31c) on which a first other vehicle (21, and 21a to 21c) travels intersect at an intersecting point (P, and P1 to P3). In such traveling scene, the driving support device supports driving of the host-vehicle 20 by determining whether the host-vehicle 20 can enter the intersecting point (P, and P1 to P3).

The host-vehicle track 30 is, during a time period from the present to the near future (for example, 1 second to 30 seconds ahead), a track on map on which a host-vehicle would travel or a track on map on which a host-vehicle is expected to travel, and for example, is a track passed though by the center of an axle of a drive wheel of the host-vehicle 20. The first other vehicle track (31, and 31a to 31c) is defined similarly to the host-vehicle track 30.

Figure 4A:
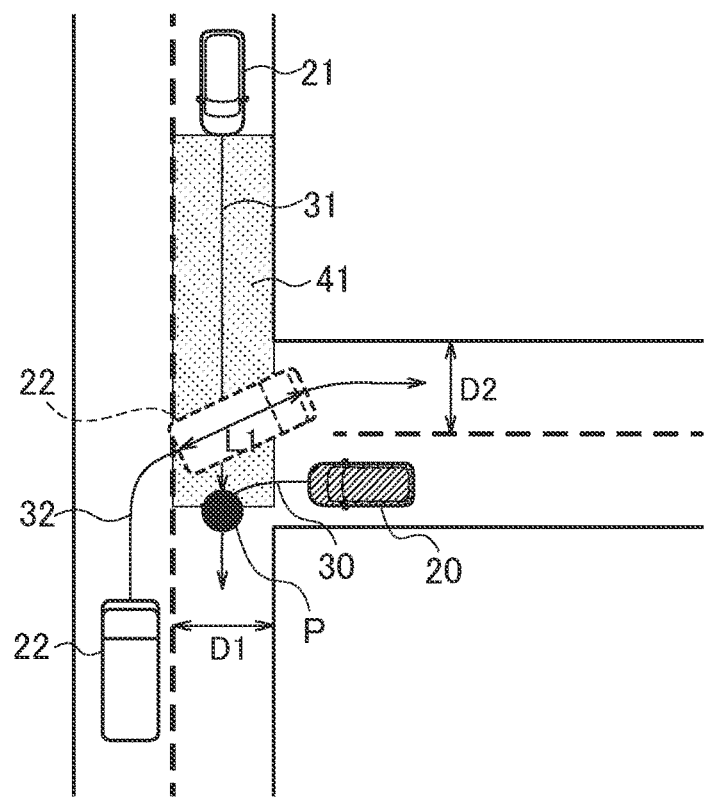
FIG. 4A is a top view illustrating a first traveling scene.
Figure 4B:
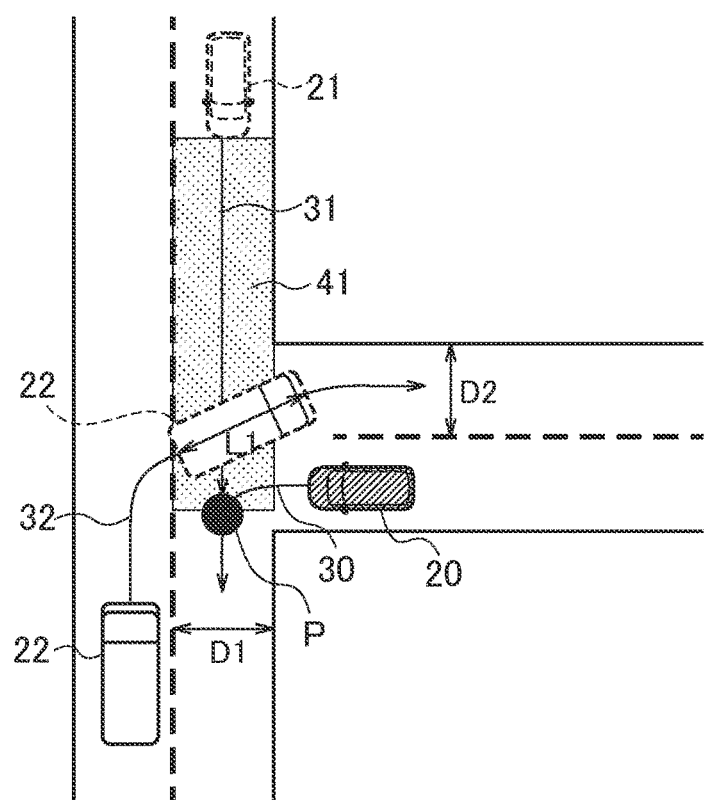
FIG. 4B is a top view illustrating a second traveling scene.
Figure 4C:
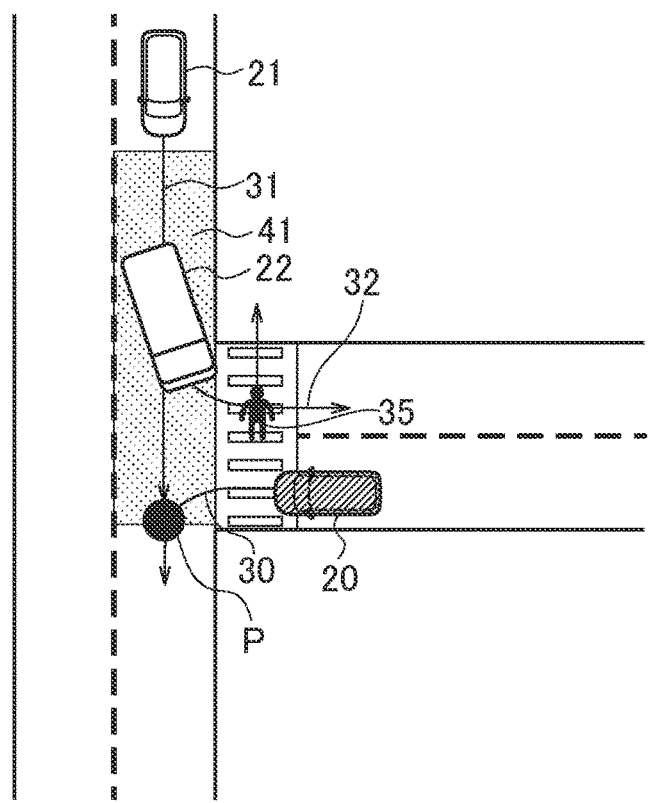
FIG. 4C a top view illustrating a third traveling scene.
Figure 4D:
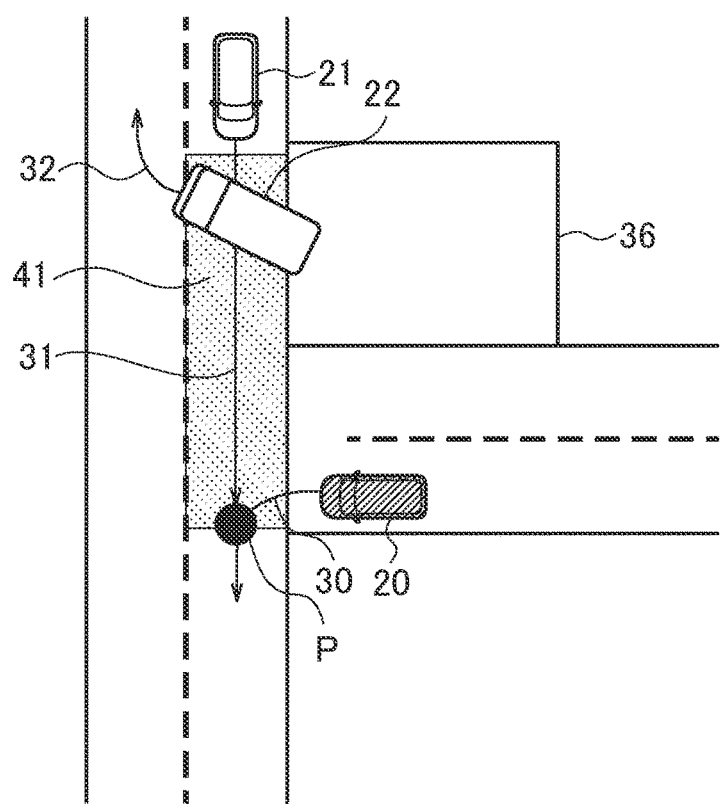
FIG. 4D is a top view illustrating a fourth traveling scene.
Figure 4E:
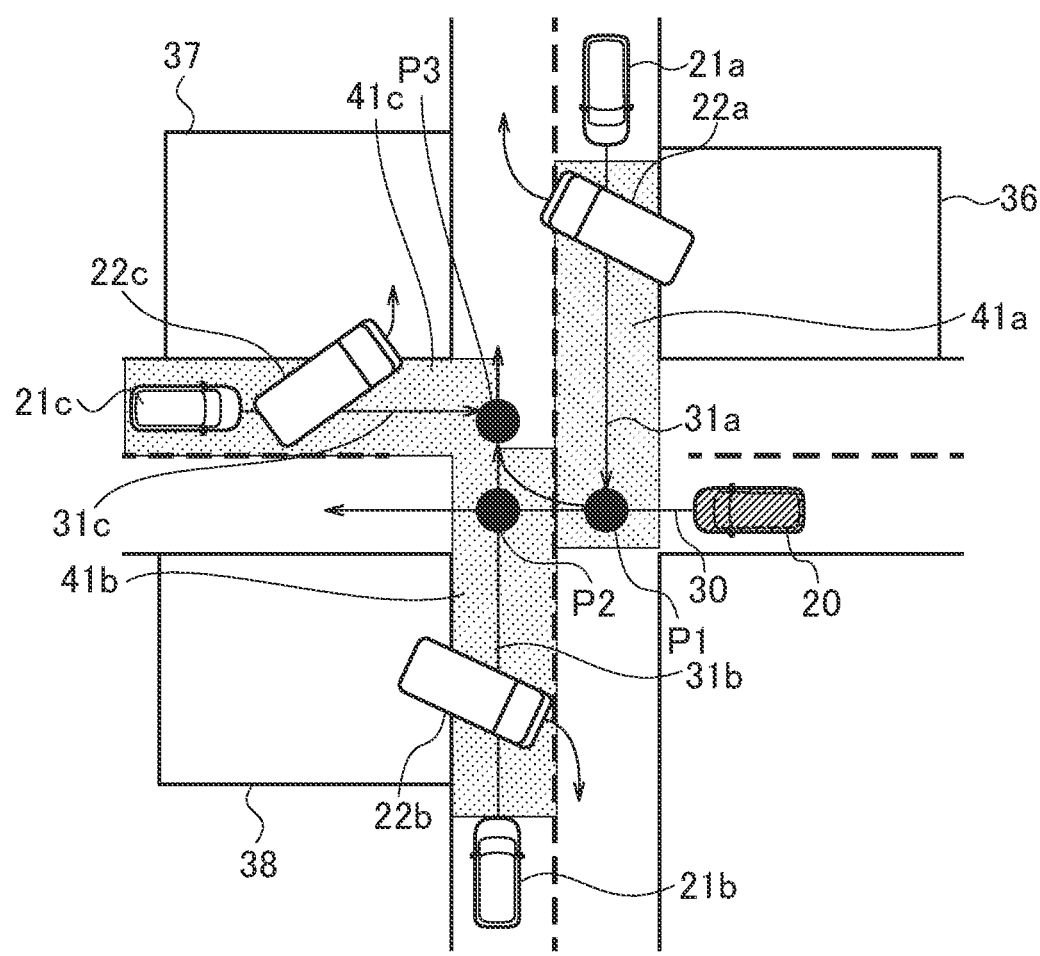
FIG. 4E is a top view illustrating a fifth traveling scene.

A broader concept that the host-vehicle track 30 intersects with the first other vehicle track (31, and 31a to 31c) includes a lower concept that the host-vehicle track 30 merges to the first other vehicle track (31) as illustrated in FIG. 4A to FIG. 4D and a lower concept that the host-vehicle track 30 intersects with the first other vehicle track (31a to 31c) as illustrated in FIG. 4E. In other words, the driving support device determines whether the host-vehicle 20 can merge to the intersecting point (P) or whether the host-vehicle 20 can pass the intersecting point (P1 to P3).

Details of traveling scenes illustrated in FIG. 4A to FIG. 4E, FIG. 5A, and FIG. 5B and specific operations of the driving support device in theses traveling scenes will be described later.

With reference to FIG. 1, a constitution of a driving support device according to a first embodiment is described. Here, the constitution of the driving support device is described with reference to an example of a traveling scene illustrated in FIG. 4A. The driving support device determines whether the host-vehicle 20 can enter an intersecting point P in a traveling scene in which the intersecting point P at which the host-vehicle 20 intersects with a first other vehicle 21 is present on a road to which the host-vehicle 20 intends to enter.

The driving support device includes a sensor unit 1 that acquires a road environment around the host-vehicle 20 and a surrounding environment of the host-vehicle 20, a controller 2 that determines whether the host-vehicle 20 can enter the intersecting point P based on the acquired road environment and surrounding environment, and a travel control unit 3 that controls travelling of the host-vehicle 20 based on a determination result of the controller 2.

The sensor unit 1 includes a road environment detecting unit 11 that detects a road environment around the host-vehicle 20 and a surrounding environment detecting unit 12 that detects a surrounding environment including other vehicles present around the host-vehicle 20.

The road environment detecting unit 11 acquires data indicating a road structure around the host-vehicle 20. Specifically, the road environment detecting unit 11 acquires the data indicating the road structure around the host-vehicle 20 based on a current position of the host-vehicle 20 with reference to road map data stored in an external storage device 4. The road structure includes a structure of an intersecting point at which a plurality of roads intersect, a structure of a junction at which two or more roads merge, the width of a road, the width of each lane included in the road, and a position of a doorway through which a vehicle enters/exits to/from a facility adjacent to the road.

The data indicating the road structure may be stored in the external storage device 4 as a part of the road map data. Further, a current position of the host-vehicle 20 (a self-position) may be obtained by using a GPS receiver that is mounted on the host-vehicle 20 and receives a radio wave from a GPS satellite. Alternatively, the self-position may be detected by using one of GPS, odometry, dead reckoning, and map matching using surrounding images singly or using some of them in combination. Alternatively, the data indicating the road structure around the host-vehicle 20 can be acquired based on data acquired from various sensors that are mounted on the host-vehicle 20 and include a radar, a sonar, a camera, or an LIDAR (LIDAR: Laser Imaging Detection and Ranging) without using road map data and self-position detection.

The road environment detecting unit 11 acquires data indicating a road and a lane on which the host-vehicle 20 travels, another road and another lane that intersect at ends of the road and the lane respectively, a structure of an intersecting point formed by these roads, and the width of these roads and lanes.

The surrounding environment detecting unit 12 acquires data indicating a surrounding environment of the host-vehicle 20 including a relative position, a size, and a traveling direction of another vehicle present around the host-vehicle 20 by using various sensors that are mounted on the host-vehicle 20 and include a radar, a sonar, a camera, and an LIDAR (including a three-dimensional LIDAR). The surrounding environment detecting unit 12 may receive the data indicating the surrounding environment that is acquired not only by a sensor mounted on the host-vehicle 20 but also by a sensor mounted on another vehicle present around the host-vehicle 20 or a sensor installed in a road through vehicle-to-vehicle communication or vehicle-to-road communication.

The surrounding environment detecting unit 12 acquires data indicating a relative position to the host-vehicle 20, a vehicle body length in a traveling direction, and a vehicle body length in a vehicle width direction of a first other vehicle 21 and a second other vehicle 22 that travel on other roads that intersect the road on which the host-vehicle 20 travels.

The controller 2 can be realized by using a microcomputer including a CPU (a central processing unit) that is an example of a control unit, a memory (a main storage device), and an input/output unit. A computer program (a driving support program) for causing the microcomputer to function as the controller 2 is installed in the microcomputer and then is executed. This causes the CPU of the microcomputer to function as a plurality of information processing units (13, 14, 15, and 16) of the controller 2. Note that, although here a case where the controller 2 is realized by software is taken as an example, it is needless to say that dedicated hardware for performing each information processing can be prepared for constituting the controller 2. The dedicated hardware includes devices such as application specific integrated circuits (ASICs) and conventional circuit components that are arranged to perform functions described in the first embodiment. Further, the plurality of information processing units (13, 14, 15, and 16) included in the controller 2 may be constituted by individual hardware. The controller 2 may also be used as an electronic control unit (ECU) used for other controls of a vehicle. The controller 2 may also be used as, for example, an arithmetic unit in the sensor unit 1 or the travel control unit 3. The controller 2 is connected to an auxiliary storage device (an external storage device 4) such as a magnetic disk, an optical disk, a magneto-optical disk, and a flash memory, the sensor unit 1, and the travel control unit 3.

The controller 2 includes an intersecting point estimating unit 13, a shielding time estimating unit 14, an entry time estimating unit 15, and an entry determination unit 16 as the plurality of information processing units.

The intersecting point estimating unit 13 estimates an intersecting point P at which the host-vehicle track 30 and the first other vehicle track 31 intersect with each other. Specifically, the data indicating the surrounding environment acquired from the sensor unit 1 includes data on the first other vehicle 21. The intersecting point estimating unit 13 predicts the first other vehicle track 31 from the data on the first other vehicle 21. For example, the intersecting point estimating unit 13 predicts that the first other vehicle 21 would travel straight on a currently traveling lane without change at an intersecting point from the position, the traveling direction and the speed of the first other vehicle 21. The intersecting point estimating unit 13 predicts tracks of all other vehicles present around the host-vehicle 20 detected by the surrounding environment detecting unit 12.

On the other hand, the intersecting point estimating unit 13 predicts the host-vehicle track 30. The host-vehicle 20 travels along a route to a destination set in advance. This enables predicting the host-vehicle track 30 based on the self-position and the route to the destination. Alternatively, the host-vehicle track 30 of the vehicle that turns left at an intersecting point may be predicted from the self-position and a turn signal state of the host-vehicle 20.

The intersecting point estimating unit 13 determines whether the host-vehicle track 30 and the other vehicle track 31 intersect with each other on a map. That is, the intersecting point estimating unit 13 determines whether another vehicle track that intersects with the host-vehicle track 30 is included in other predicted vehicle tracks. Here, the definition of the term "intersect" includes "merge" and "intersect." In a case where the host-vehicle track 30 and the other vehicle track 31 intersect with each other, the intersecting point estimating unit 13 specifies an intersecting point P. An intersecting point at the time of "intersecting" is a point at which the host-vehicle track 30 and another vehicle track intersect with each other. An intersecting point at the time of "merging" is a point (a junction) at which the host-vehicle track 30 and the first other vehicle track 31 overlap with each other for the first time as illustrated in FIG. 4A. The intersecting point estimating unit 13 specifies intersecting points P of all other vehicle tracks that intersect with the host-vehicle track 30.

The shielding time estimating unit 14 determines whether a second other vehicle 22 that is different from the first other vehicle 21 shields the first other vehicle track 31 from the first other vehicle 21 to the intersecting point P in the traveling scene illustrated in FIG. 4A, for example. That is, the shielding time estimating unit 14 determines whether another vehicle that shields the first other vehicle track 31 to the intersecting point P is included in other vehicles present around the host-vehicle 20, which other vehicles are detected by the surrounding environment detecting unit 12.

Specifically, the shielding time estimating unit 14 determines whether a track (a second other vehicle track 32) of another vehicle other than the first other vehicle 21 (the second other vehicle 22) intersects with the first other vehicle track 31 to the intersecting point P. That is, the shielding time estimating unit 14 determines whether the tracks (31 and 32) of other vehicles (21 and 22) intersect respectively. In a case where the tracks (31 and 32) intersect, the shielding time estimating unit 14 estimates a time required for both of other vehicles (21 and 22) whose tracks intersect to arrive at a point at which the tracks (31 and 32) thereof intersect. The shielding time estimating unit 14 determines that another vehicle (the second other vehicle 22) that arrives at a point at which the tracks (31 and 32) intersect earlier shields a track (the first other vehicle track 31) of another vehicle (the first other vehicle 21) that arrives at the point later. In the traveling scene illustrated in FIG. 4A, the shielding time estimating unit 14 determines that another vehicle other than the first other vehicle 21 (the second other vehicle 22) shields the first other vehicle track 31 to the intersecting point P. The shielding time estimating unit 14 checks whether tracks of other vehicles are shielded for the combinations of intersections of tracks of all other detected vehicles.

In the first embodiment, the shielding time estimating unit 14 further narrows down second other vehicles 22 that shield the first other vehicle track 31 to the intersecting point P to a second other vehicle 22 whose track (the second other vehicle track 32) does not intersect with the host-vehicle track 30. That is, vehicles are narrowed down to a second other vehicle 22 whose track (the second other vehicle track 32) is spaced apart from the host-vehicle track 30. It can be determined that the second other vehicle 22 whose track (the second other vehicle track 32) is spaced apart from the host-vehicle track 30 has no risk of coming into contact with the host-vehicle 20. Therefore, the shielding time estimating unit 14 can extract a second other vehicle 22 that shields the first other vehicle track 31 to the intersecting point P and has no risk of coming into contact with the host-vehicle 20.

Narrowing down of vehicles to a second other vehicle 22 that has no risk of coming into contact with the host-vehicle 20 is an additional matter. The shielding time estimating unit 14 may estimate a shielding time described as follows as long as a vehicle is the second other vehicle 22 that shields the first other vehicle track 31 to the intersecting point P regardless of whether the vehicle has a risk of coming into contact with the host-vehicle 20. If there is a risk of contact between the host-vehicle 20 and the second other vehicle 22, the host-vehicle track 30 of the host-vehicle 20 may be corrected as described later. This enables setting a distance between the host-vehicle track 30 and the second other vehicle track 32 to have a longer than predetermined value and eliminating a risk of contact.

Then, the shielding time estimating unit 14 estimates a time during which the second other vehicle 22 shields the first other vehicle track 31 (the shielding time). For example, as illustrated in FIG. 4A, the shielding time estimating unit 14 estimates the shielding time by using a vehicle body length (L1) of the second other vehicle 22 in the traveling direction, a lane width (D1) of a lane on which the first other vehicle 21 travels, and a lane width (D2) of a lane on which the second other vehicle 22 travels. The length (L1), the lane width (D1), and the lane width (D2) may be obtained from the road environment detected by the road environment detecting unit 11 and the surrounding environment detected by the surrounding environment detecting unit 12. The shielding time estimating unit 14 can estimate a vehicle speed of the second other vehicle 22 at the time of shielding the first other vehicle track 31 from the length (L1), the lane width (D1) the lane width (D2) and a curvature of the second other vehicle track 32. Further, the "shielding time" is a time during which the second other vehicle 22 and the first other vehicle track 31 overlap with each other or a time during which the second other vehicle 22 and a first lane area 41 overlap with each other. The "first lane area 41" is an area that includes the first other vehicle track 31 and also includes the lane width (D2). The shielding time estimating unit 14 estimates shielding times of all extracted second other vehicles 22.

The entry time estimating unit 15 estimates a time from when the host-vehicle 20 starts entering the intersecting point P to when the host-vehicle 20 finishes entering the intersecting point P (a required entry time). The required entry time is a time from when the host-vehicle 20 starts entering the intersecting point P to when the host-vehicle 20 finishes entering the intersecting point P. Specifically, the entry time estimating unit 15 estimates the required entry time from the road environment detected by the road environment detecting unit 11, the surrounding environment detected by the surrounding environment detecting unit 12, and the host-vehicle track 30. For example, a vehicle speed of the host-vehicle 20 until the host-vehicle 20 enters the intersecting point P can be estimated from the lane width (D2) of the lane to which the host-vehicle 20 enters, the presence or absence of an obstacle, the curvature of the host-vehicle track 30, and the vehicle body length of the host-vehicle 20 in the traveling direction. In the traveling scene illustrated in FIG. 4A in which the host-vehicle track 30 and the other vehicle track 31 merge at the intersecting point P, "at the time of start entering the intersecting point P" is, for example, a time at which at least a portion (a front end portion) of the host-vehicle 20 starts overlapping with the first other vehicle track 31 in planar view. Alternatively, "at the time of finish entering the intersecting point P" is a time at which a position of the host-vehicle 20 overlaps with the first other vehicle track 31, that is, a time at which the host-vehicle 20 arrives at the intersecting point P. "At the time of start entering the intersecting point P" may be also a time at which at least a portion of the host-vehicle 20 starts overlapping with the first lane area 41 instead of a time at which at least a portion of the host-vehicle 20 starts overlapping with the first other vehicle track 31. The "position of the host-vehicle 20" is a position representing the host-vehicle 20, and is a position of the center of an axle of a drive wheel of the host-vehicle 20, for example. The same applies to positions of other vehicles.

The entry determination unit 16 determines whether the host-vehicle 20 can enter the intersecting point P based on the shielding time during which the second other vehicle 22 shields the first other vehicle track 31 and the required entry time from when the host-vehicle 20 starts entering the intersecting point P to when the host-vehicle 20 finishes entering the intersecting point P. Specifically, the entry determination unit 16 compares the shielding time during which the second other vehicle 22 shields the first other vehicle track 31 with the required entry time from when the host-vehicle 20 starts entering the intersecting point P to when the host-vehicle 20 finishes entering the intersecting point P. If the shielding time is longer than the required entry time, the entry determination unit 16 determines that the host-vehicle 20 can enter the intersecting point P. Alternatively, if the shielding time is equal to or shorter than the required entry time, the entry determination unit 16 determines that the host-vehicle 20 may not enter the intersecting point P.

If the second other vehicle 22 shields the first other vehicle track 31 to the intersecting point P, the first other vehicle 21 may not travel on the first other vehicle track 31 to arrive at the intersecting point P. This reduces a risk of contact between the host-vehicle 20 and the first other vehicle 21 at the intersecting point P during shielding. Therefore, if the shielding time during which the second other vehicle 22 shields the first other vehicle track 31 is equal to or longer than the required entry time from when the host-vehicle 20 starts entering the intersecting point P to when the host-vehicle 20 finishes entering the intersecting point P, it can be determined that the host-vehicle 20 can enter the intersecting point P.

The travel control unit 3 is a unit that controls travelling of the host-vehicle 20 and realizes an automatic driving function. The driving support device according to the first embodiment may be applied to a host-vehicle 20 with the automatic driving function or alternatively may be applied to a host-vehicle 20 without the automatic driving function. Further, the driving support device may be applied to the host-vehicle 20 that can switch between automatic driving and manual driving. Note that, the automatic driving according to the present embodiment indicates a state in which, for example, at least any one of actuators such as a brake, an accelerator, and a steering is controlled without an operation by an occupant in the host-vehicle 20. Therefore, no problems are caused even if other actuators are operated through an operation by an occupant. Further, the automatic driving may be a state in which any control such as acceleration/deceleration control and lateral position control is performed. Further, the manual driving according to the present embodiment indicates, for example, a state in which a brake, an accelerator, and a steering are operated by an occupant.

The travel control unit 3 autonomously controls travelling of the host-vehicle 20 based on a determination result by the entry determination unit 16. In a case where the entry determination unit 16 determines that the host-vehicle 20 can enter the intersecting point P, an occupant operates a brake, an accelerator, and a steering to cause the host-vehicle 20 to be moved along the host-vehicle track 30 and causes the host-vehicle 20 to be entered to the intersecting point P.

If the entry determination unit 16 determines that the host-vehicle 20 may not enter, the travel control unit 3 causes the host-vehicle 20 to be stopped in front of the first lane area 41, or in front of a predetermined stop line. Then, the travel control unit 3 determines whether the host-vehicle 20 can enter the intersecting point P based on data acquired from the sensor unit 1 and its own termination logic. As a determination algorithm of the travel control unit 3, a known algorithm may be used.

The first embodiment describes an example in which the travel control unit 3 autonomously controls travelling of the host-vehicle 20. However, the present invention is not limited to this, and driving of the host-vehicle 20 can be supported even if the host-vehicle 20 does not have the automatic driving function or even in a state in which manual driving is selected from between automatic driving and manual driving. For example, the driving support device notifies the occupant of the host-vehicle 20 of the determination result as to whether the host-vehicle 20 can enter the intersecting point P by the controller 2 through voice, an image, and a video.

Figure 2:
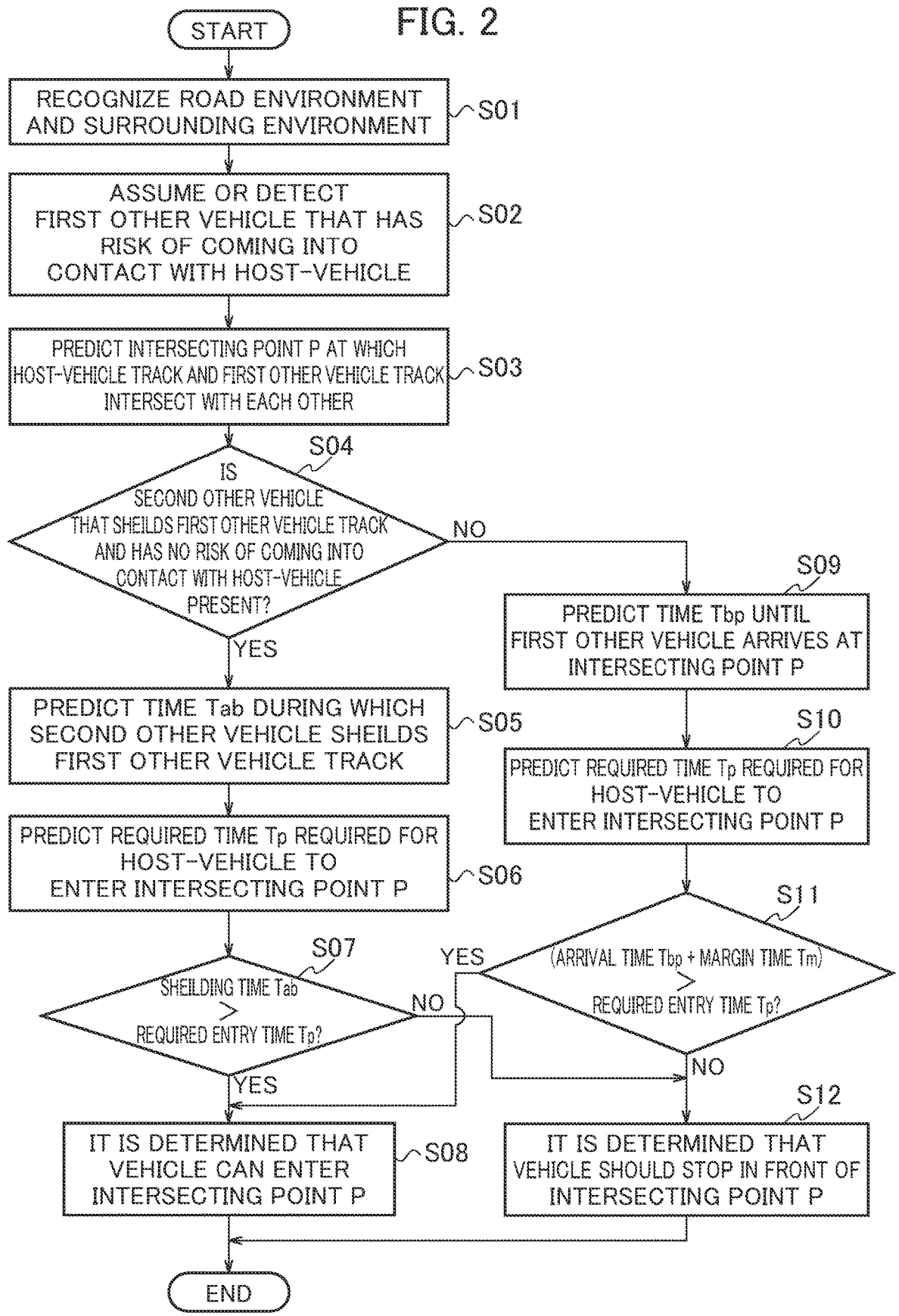
FIG. 2 is a flowchart illustrating a driving support method according to a first embodiment that is an example of an operations of a driving support device of FIG. 1.

With reference to a flowchart illustrated in FIG. 2, described is a driving support method according to the first embodiment that is an example of operations of the driving support device illustrated in FIG. 1. Here, with reference to the example of the traveling scene illustrated in FIG. 4A, operations of a driving support device are described.

First, in step S01, the sensor unit 1 acquires the road environment around the host-vehicle 20 and the surrounding environment of the host-vehicle 20. Specifically, with reference to the road map data stored in the external storage device 4, the road environment detecting unit 11 acquires the data indicating the road structure around the host-vehicle 20 based on the current position of the host-vehicle 20. The surrounding environment detecting unit 12 acquires data indicating the surrounding environment of the host-vehicle 20 including a relative position, a size, and a traveling direction of another vehicle present around the host-vehicle 20 by using various sensors that are mounted on the host-vehicle 20 and include a radar, a sonar, a camera, and an LIDAR.

A process advances to step S02, and the controller 2 assumes or detects another vehicle that has a risk of coming into contact with the host-vehicle 20. Specifically, the intersecting point estimating unit 13 predicts the first other vehicle track 31 of the first other vehicle 21 from the position, the traveling direction and the speed of the first other vehicle 21. The intersecting point estimating unit 13 predicts first other vehicle tracks 31 of all other vehicles present around the host-vehicle 20 detected by the surrounding environment detecting unit 12. On the other hand, the intersecting point estimating unit 13 predicts the host-vehicle track 30. Then, the intersecting point estimating unit 13 determines whether the host-vehicle track 30 and the other vehicle track 31 intersect with each other on a map. The controller 2 determines the first other vehicle 21 whose track that is the first other vehicle track 31 intersects with the host-vehicle track 30 as another vehicle that has a risk of coming into contact with the host-vehicle 20.

A process advances to step S03, and the intersecting point estimating unit 13 estimates an intersecting point P at which the host-vehicle track 30 and the first other vehicle track 31 of the first other vehicle 21 that has a risk of contact intersect with each other.

A process advances to step S04, and the controller 2 determines whether a second other vehicle 22 that shields the first other vehicle track 31 and has no risk of coming into contact with the host-vehicle 20 is present. The shielding time estimating unit 14 determines whether the second other vehicle 22 that is different from the first other vehicle 21 shields the first other vehicle track 31. If the second other vehicle 22 that shields the first other vehicle track 31 is present, the shielding time estimating unit 14 determines whether the track of the second other vehicle 22 (the second other vehicle track 32) intersects with the host-vehicle track 30. The shielding time estimating unit 14 extracts the second other vehicle 22 that shields the first other vehicle track 31 and has no risk of coming into contact with the host-vehicle 20.

In step S04, if at least one second other vehicle 22 is extracted, a process advances to step S05 to determine whether the host-vehicle 20 can enter the intersecting point P based on the time during which the second other vehicle 22 shields the first other vehicle track 31 (the shielding time). On the other hand, if the second other vehicle 22 is not extracted, a process advances to step S09 to determine whether the host-vehicle 20 can enter the intersecting point P based on a time until the first other vehicle 21 arrives at the intersecting point P.

A process advances to step S05, and the shielding time estimating unit 14 estimates a time during which the second other vehicle 22 shields the first other vehicle track 31 (a shielding time Tab).

A process advances to step S06, and the entry time estimating unit 15 estimates a time required for the host-vehicle 20 to start entering the intersecting point P to finish entering the intersecting point P (a required entry time Tp).

A process advances to step S07, and the entry determination unit 16 compares the shielding time (Tab) during which the second other vehicle 22 shields the first other vehicle track 31 with the required entry time (Tp) from when the host-vehicle 20 starts entering the intersecting point P to when the host-vehicle 20 finishes entering the intersecting point P.

If the shielding time (Tab) is longer than the required entry time (Tp) (YES in S07), a process advances to step S08, and the entry determination unit 16 determine that the host-vehicle 20 can enter the intersecting point P. Alternatively, if the shielding time (Tab) is equal to or shorter than the required entry time (Tp) (NO in S07), a process advances to step S12, and the entry determination unit 16 determines that the host-vehicle 20 should stop in front of the intersecting point P because the host-vehicle 20 may not enter the intersecting point P.

On the other hand, in step S09, the entry determination unit 16 predicts a time until the first other vehicle 21 arrives at the intersecting point P (an arrival time: Tbp). Specifically, the arrival time (Tbp) can be predicted from a position on a map and a current vehicle speed of the first other vehicle 21. A process advances to step S10, and as similar to step S06, the entry time estimating unit 15 estimates a time required for the host-vehicle 20 to start entering the intersecting point P to finish entering the intersecting point P (the required entry time Tp).

A process advances to step S11, and the entry determination unit 16 compares the required entry time (Tp) with a total time (Tbp+Tm) obtained by adding a predetermined margin time (Tm) to the arrival time (Tbp).

If the total time (Tbp+Tm) is longer than the required entry time (Tp) (YES in S11), a process advances to step S08, and the entry determination unit 16 determines that the host-vehicle 20 can enter the intersecting point P. Alternatively, if the total time (Tbp+Tm) is equal to or shorter than the required entry time (Tp) (NO in S11), a process advances to step S12, and the entry determination unit 16 determines that the host-vehicle 20 should stop in front of the intersecting point P because the host-vehicle 20 may not enter the intersecting point P.

As described above, in accordance with the first embodiment of the present invention, the following operations and effects can be obtained.

While the second other vehicle 22 shields the first other vehicle track 31 to the intersecting point P, the first other vehicle 21 may not travel on the first other vehicle track 31 to arrive at the intersecting point P. For this reason, while the second other vehicle 22 shields the track, a risk of contact between the host-vehicle 20 and the first other vehicle 21 at the intersecting point P is lowered. Therefore, whether the host-vehicle 20 can enter the intersecting point P can be determined based on the shielding time (Tab) and the required entry time (Tp). This eliminates the necessity of a process of determining whether the host-vehicle 20 has a risk of coming into contact with the first other vehicle 21, reduces the amount of information to be processed, and can suppress delays in driving support of the host-vehicle 20. Even in an environment where the first other vehicle 21 may not be detected, it can be determined that the host-vehicle 20 can enter an intersecting point. For example, even if a shape of a road on which the first other vehicle 21 travels is a curve or the like and the visibility is poor, it can be determined that the host-vehicle 20 can enter an intersecting point.

If the shielding time (Tab) is longer than the required entry time (Tp), it can be determined that the host-vehicle 20 can enter the intersecting point P. This eliminates the necessity of a process of determining whether the host-vehicle 20 has a risk of coming into contact with the first other vehicle 21, reduces the amount of information to be processed, and can suppress delays in driving support of the host-vehicle.

The shielding time estimating unit 14 predicts the shielding time (Tab) by using the vehicle body length (L1) of the second other vehicle 22 in the traveling direction, the lane width (D1) of the lane on which the first other vehicle 21 travels, and the lane width (D2) of the lane on which the second other vehicle 22 travels. The shielding time (Tab) can be predicted in accordance with a size of the second other vehicle 22 and a road shape.

The second other vehicle track 32 on which the second other vehicle 22 travels is spaced apart from the host-vehicle track 30. This can lower a risk of coming into contact with the first other vehicle 21 by using operations of the second other vehicle 22 that has no risk of coming into contact with the host-vehicle 20.

Second Embodiment

In a second embodiment, as similar to the first embodiment, the controller 2 determines whether the host-vehicle 20 can enter the intersecting point P based on the shielding time and the required entry time. However, a specific determination method of the second embodiment is different from that in the first embodiment.

Constitutions of a driving support device according to the second embodiment are the same as those in FIG. 1 except for the entry determination unit 16. The entry determination unit 16 according to the second embodiment predicts a time until the first other vehicle 21 arrives at the intersecting point P (an arrival time Tabp) based on the shielding time (Tab). For example, the arrival time (Tabp) may be calculated by adding a predetermined reference time to the shielding time (Tab). Alternatively, the arrival time (Tabp) may be calculated by multiplying the shielding time (Tab) by a predetermined coefficient (1.1 to 1.5).

Then, if a total time (Tall) obtained by adding the predetermined margin time (Tm) to the arrival time (Tabp) is longer than the required entry time (Tp), the entry determination unit 16 determines that the host-vehicle 20 can enter the intersecting point P.

Figure 3:
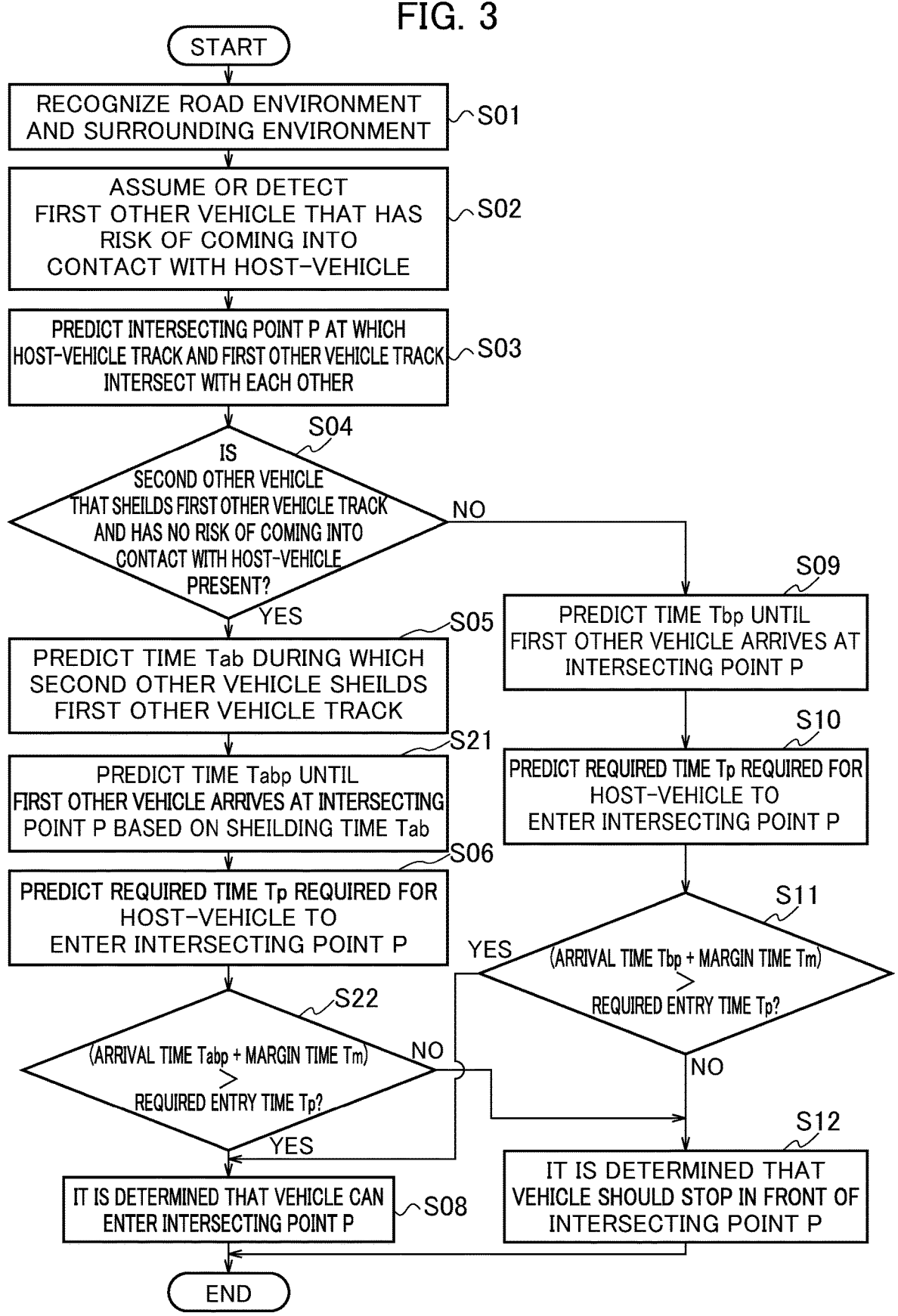
FIG. 3 is a flowchart illustrating a driving support method according to a second embodiment that is an example of an operation of a driving support device according to a second embodiment.

With reference to a flowchart illustrated in FIG. 3, a driving support method according to the second embodiment that is an example of operations of a driving support device according to the second embodiment is described. Here, with reference to the example of the traveling scene illustrated in FIG. 4A, operations of the driving support device are described. Further, points common to those in FIG. 2 are omitted as appropriate and differences will be mainly described.

Steps S01 to S06 and steps S08 to S12 are processes that are the same as those in FIG. 2. A flowchart illustrated in FIG. 3 is different form the flowchart illustrated FIG. 2 in that step S21 is further performed between step S05 and step S06 and step S22 is performed instead of step S07.

In step S21, the entry determination unit 16 predicts the time until the first other vehicle 21 arrives at the intersecting point P (the arrival time Tabp) based on the shielding time (Tab).

In step S22, if the total time (Tall) is longer than the required entry time (Tp) (YES in S22), a process advances to step S08, and the entry determination unit 16 determines that the host-vehicle 20 can enter the intersecting point P. Alternatively, if the total time (Tall) is equal to or shorter than the required entry time (Tp) (NO in S22), a process advances to step S12, and the entry determination unit 16 determines that the host-vehicle 20 should stop in front of the intersecting point P because the host-vehicle 20 may not enter the intersecting point P.

As described above, according to the second embodiment, the entry determination unit 16 can predict the time until the first other vehicle 21 arrives at the intersecting point P (the arrival time Tabp) from the shielding time (Tab). Accordingly, if the total time (Tall) obtained by adding the predetermined margin time (Tm) to the arrival time (Tabp) is longer than the required entry time (Tp), it can be determined that the host-vehicle 20 can enter the intersecting point P. This eliminates the necessity of a process of determining whether the host-vehicle 20 has a risk of coming into contact with the first other vehicle 21, reduces the amount of information to be processed, and can suppress delays in driving support of the host-vehicle 20.

(First Modified Example)

In a first modified example, a specific example of a time (a timing) at which the entry determination unit 16 determines whether the host-vehicle 20 can enter is described. Actually, a case where the second other vehicle 22 changes the judgement on shielding on the way is also considered. Specifically, there is a case where the second other vehicle 22 temporarily stops to pass the first other vehicle 21 first before the second other vehicle 22 start shielding the first other vehicle tracks. In order to cope with such a change in judgement of the second other vehicle 22, the entry determination unit 16 determines that the host-vehicle 20 can enter the intersecting point P only after the second other vehicle 22 starts shielding the first other vehicle track 31. In other words, the entry determination unit 16 does not determine that the host-vehicle 20 can enter the intersecting point P before the second other vehicle 22 starts shielding the first other vehicle track 31. Even if the second other vehicle 22 changes the judgement on shielding on the way, the entry determination unit 16 can make a safe entry determination.

For example, after at least a part of the second other vehicle 22 starts overlapping with the first other vehicle track 31, the entry determination unit 16 determines that the host-vehicle 20 can enter the intersecting point P. Alternatively, after at least a part of the second other vehicle 22 starts overlapping with the first lane area 41 including the first other vehicle track 31, the entry determination unit 16 determines that the host-vehicle 20 can enter the intersecting point P. In other words, the entry determination unit 16 make a determination after at least a part of the second other vehicle 22 crosses a center line of a road. Alternatively, the entry determination unit 16 determines that the host-vehicle 20 can enter the intersecting point P after the second other vehicle 22 arrives at a position where the first other vehicle 21 may not pass. It is possible to cope with a case where the second other vehicle 22 that is about to shield the first other vehicle track 31 stops before shielding the first other vehicle track 31. That is, if shielding of the first other vehicle track 31 is interrupted before the second other vehicle 22 starts shielding the first other vehicle track 31, the entry determination unit 16 does not determine that the host-vehicle 20 can enter the intersecting point P. Even if the second other vehicle 22 changes the judgement on shielding on the way, the entry determination unit 16 can make a safe entry determination.

(Second Modified Example)

In a second modified example, a time (a timing) at which the host-vehicle 20 starts travelling is described. The host-vehicle 20 starts travelling when the second other vehicle 22 starts shielding the first other vehicle track 31 and also when the host-vehicle 20 determines that it is possible to enter the intersecting point P. This can reduce a time (a required entry time) from when the host-vehicle 20 starts entering the intersecting point P to when the host-vehicle 20 finishes entering the intersecting point P. Further, by showing the start intention of the host-vehicle 20 to the first other vehicle 21, a risk of contact between the first other vehicle 21 and the host-vehicle 20 can be lowered. For example, when at least a part of the second other vehicle 22 crosses the center line of the road, the host-vehicle 20 determines that it is possible to enter the intersecting point P, and by the host-vehicle 20 starts slowing down to the intersecting point, the host-vehicle 20 can express an intention to enter the intersecting point to the first other vehicle 21.

(Third Modified Example)

In the above described embodiments and modified examples, the priority order of vehicles entering an intersecting point (the intersecting point P) between roads is not described. However, in practice, there is a difference in the priority order between intersecting roads. Even if the priority order of the first other vehicle 21 entering the intersecting point P is higher than the priority order of the host-vehicle 20 entering the intersecting point P, by applying the embodiments and modified examples, a safe entry determination can be made.

(First Traveling Scene)

FIG. 4A is a top view illustrating a first traveling scene. An end of the road on which the host-vehicle 20 travels is connected to the middle of another road. The host-vehicle 20 is approaching to a T-shaped intersecting point. The host-vehicle 20 sets a route of turning left at the intersecting point and then merging to another road. Alternatively, as an indication of the intention to make a left turn at the intersecting point, the host-vehicle 20 blinks a left turn signal. On the other hand, the first other vehicle 21 travels on another road and approaches to the intersecting point. A direction in which the first other vehicle 21 travels is the same as a direction in which the host-vehicle 20 travels after turning left. The first other vehicle 21 is predicted to travel straight through the intersecting point based on a speed thereof, a state of the turn signal, and the like. Accordingly, the host-vehicle track 30 on which the host-vehicle 20 travels and the first other vehicle track 31 on which the first other vehicle 21 travels intersect with each other at the intersecting point. In other words, the host-vehicle track 30 and the first other vehicle track 31 merge at the intersecting point P.

On the other hand, the second other vehicle 22 that is different from the first other vehicle 21 travels on another road in a direction different from the travelling direction of the first other vehicle 21. The second other vehicle 22 is about to turn right at the intersecting point to enter the road on which the host-vehicle 20 travels. Accordingly, the second other vehicle track 32 intersects with the first other vehicle track 31 to the intersecting point P.

In the above described first traveling scene, the driving support device according to the first and second embodiments can determine whether the host-vehicle 20 can enter the intersecting point P (an intersecting point) based on the shielding time during which the second other vehicle 22 shields the first other vehicle track 31 and the required entry time that is a time from when the host-vehicle 20 starts entering the intersecting point P to when the host-vehicle 20 finishes entering the intersecting point P.

(Second Traveling Scene)

FIG. 4B is a top view illustrating a second traveling scene. Unlike the first traveling scene, the first other vehicle 21 is not detected. In a case where the host-vehicle 20 is approaching the intersecting point, the driving support device may assume the first other vehicle 21 that approaches the intersecting point at a predetermined speed from a position away from the intersecting point by a predetermined distance. Even in an environment where the first other vehicle 21 may not be detected, it is possible to determine whether the host-vehicle 20 can enter based on the assumed first other vehicle 21.

(Third Traveling Scene)

FIG. 4C is a top view illustrating a third traveling scene. In the third traveling scene, an obstacle that obstructs a course of the second other vehicle 22 is present. As an example of the obstacle, a pedestrian 35 on a pedestrian crosswalk shields the course of the second other vehicle 22. The second other vehicle 22 precedes the first other vehicle 21 while traveling on the same lane as the first other vehicle 21. The second other vehicle 22 takes a course 32 of turning left at the intersecting point. The second other vehicle 22 needs to stop temporarily in front of the pedestrian crosswalk because the pedestrian 35 is on the pedestrian crosswalk on the course 32. While the second other vehicle 22 is temporarily stopped, as illustrated in FIG. 4C, the second other vehicle 22 keeps shielding the first other vehicle track 31.

Therefore, the shielding time estimating unit 14 predicts the shielding time based on the obstacle (the pedestrian 35) that obstructs the course 32 of the second other vehicle 22. For example, the shielding time estimating unit 14 may predict a time required until the second other vehicle 22 passes the pedestrian crosswalk (a crossing time) as the shielding time from a positional relationship between the course 32 and the pedestrian 35 and a moving speed of the pedestrian 35. In a case where the pedestrian 35 or the like crossing the road obstructs the course 32 of the second other vehicle 22, the shielding time can be predicted based on the crossing time.

(Fourth Traveling Scene)

FIG. 4D is a top view illustrating a fourth traveling scene. In the fourth traveling scene, the second other vehicle 22 is about to enter the road by turning right from a doorway of a facility 36 adjacent to the road. The second other vehicle 22 shields the first other vehicle track 31 at the time of entering the road. The shielding time estimating unit 14 estimates the shielding time by using a curvature of the second other vehicle track 32 when the second other vehicle 22 enters the road, a lane width of a lane to which the second other vehicle 22 is about to enter, and a vehicle body length of the second other vehicle 22 in a traveling direction. Note that, a position of the doorway of the facility 36 adjacent to the road is acquired by the road environment detecting unit 11.

(Fifth Traveling Scene)

FIG. 4E is a top view illustrating a fifth traveling scene. In the fifth traveling scene, the middle of the road on which the host-vehicle 20 travels is connected to the middle of another road to form an intersecting point. The road on which the host-vehicle 20 travels intersects with another road. The host-vehicle track 30 is a course that goes straight ahead through an intersecting point. The first other vehicles (21a and 21b) are present on another road. The first other vehicle 21c is present on an opposite lane of the same road as the host-vehicle 20. All of the first other vehicles (21a, 21b, and 21c) are approaching the intersecting point. The first other vehicles (21a, 21b, and 21c) are predicted to travel straight through the intersecting point from a speed thereof and the state of the turn signal. Accordingly, the host-vehicle track 30 that goes straight through the intersecting point and the first other vehicle tracks (31a and 31b) on which the first other vehicles (21a and 21b) travel respectively intersect at the intersecting points (P1 and P2).

In a traveling scene illustrated in FIG. 4E in which the host-vehicle track 30 and the first other vehicle tracks (31a and 31b) intersect at the intersecting points (P1 and P2), "at the time of start entering the intersecting points (P1 and P2)" is for example, a time at which at least a portion (a front end portion) of the host-vehicle 20 starts overlapping with the first other vehicle tracks (31a and 31b) in planar view. The "at the time of finish entering the intersecting points (P1 and P2)" is, for example, a time at which a rear end portion of the host-vehicle 20 does not overlap with the first other vehicle tracks (31a and 31b) in planar view. In the definition of "at the time of start entering the intersecting points (P1 and P2)" and "at the time of finish entering the intersecting points (P1 and P2)," described above, "the first other vehicle tracks (31a and 31b)" may be replaced to "first lane areas (41a and 41b)." In other words, "the required entry time" is a time during which at least a part of the host-vehicle 20 overlaps with the first other vehicle tracks (31a and 31b) or a time during which at least a part of the host-vehicle 20 overlaps with the first lane areas (41a and 41b).

On the other hand, the second other vehicles (22a and 22b) are about to enter the road from doorways of facilities (36 and 38) adjacent to the road. At the time of entering the road, the second other vehicles (22a and 22b) respectively shielded the first other vehicle tracks (31a and 31b). The shielding time estimating unit 14 estimates each of the shielding times by using a curvature of a second other vehicle track at the time of entering the road, the lane width of the lane to which the second other vehicles (22a and 22b) are about to enter, and a vehicle body length of the second other vehicles (22a, 22b, and 22c) in the traveling direction. The entry determination unit 16 determines whether the host-vehicle 20 can enter each of the intersecting points (P1 and P2) based on the shielding time and the required entry time. Specifically, only if it is determined that the host-vehicle 20 can enter all of the intersecting points (P1 and P2), the entry determination unit 16 determines that the host-vehicle 20 can enter the intersecting point. Alternatively, if even only a single intersecting point of the intersecting points (P1 and P2) is determined as an intersecting point to which the host-vehicle 20 may not enter, the entry determination unit 16 does not determine that the host-vehicle 20 can enter the intersecting point.

Note that, if the host-vehicle track 30 is a course of turning right at an intersecting point, as illustrated in FIG. 4E, the host-vehicle track 30 intersects with the first other vehicle tracks (31a, 31b, and 31c) on which the first other vehicles (21a, 21b, and 21c) travel respectively at intersecting points (P1 and P3). On the other hand, the second other vehicle (22c) is about to enter a doorway of a facility (37) from the road. The second other vehicle (22c) shields the first other vehicle track (31c) at the time of entering the facility (37). The entry determination unit 16 determines whether the host-vehicle 20 can enter each of the intersecting points (P1 and P3) based on the shielding time and the required entry time.

(Sixth Traveling Scene)

In the first and second embodiments, the shielding time estimating unit 14 narrows down the second other vehicles 22 that shield the first other vehicle track 31 to the intersecting point P to a second other vehicle 22 whose track that is the second other vehicle track 32 does not interact with the host-vehicle track 30. On the other hand, in the sixth traveling scene, the host-vehicle track 30a is corrected without narrowing down the second other vehicles 22.

Figure 5A:
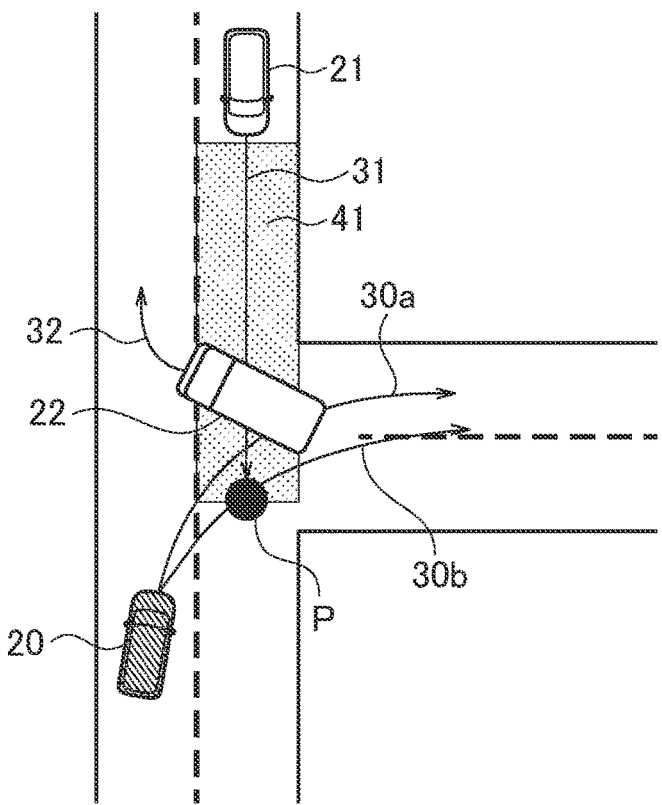
FIG. 5A a top view illustrating a sixth traveling scene.

FIG. 5A is a top view illustrating a sixth traveling scene. In a case where a distance between the second other vehicle track 32 and the host-vehicle track 30a is equal to or less than a predetermined value, there is a risk of contact between the host-vehicle 20 and the second other vehicle 22. In the sixth traveling scene, to eliminate a risk of contact between the second other vehicle 22 and the host-vehicle 20, the host-vehicle track 30a is corrected such that the distance between the host-vehicle track 30 and the second other vehicle track 32 becomes longer than the predetermined value.

The middle of the road on which the host-vehicle 20 travels is connected to an end of another road. The host-vehicle 20 is approaching a T-shaped intersecting point. The host-vehicle 20 sets a route of turning right at the intersecting point to enter another road. On the other hand, the first other vehicle 21 travels on the opposite lane of the same road as the host-vehicle 20 and approaches the intersecting point. The host-vehicle track 30a on which the host-vehicle 20 travels and the first other vehicle track 31 on which the first other vehicle 21 travels intersect with each other at the intersecting point.

On the other hand, the second other vehicle 22 that is different from the first other vehicle 21 enters the intersecting point from another road and is about to turn right at the intersecting point. The second other vehicle track 32 intersects with the first other vehicle track 31. The second other vehicle 22 shields the first other vehicle track 31.

In a case where it is determined that the host-vehicle 20 can enter the intersecting point (an intersecting point), the travel control unit 3 determines whether the distance between the second other vehicle track 32 and the host-vehicle track 30a is equal to or less than the predetermined value. If it is determined that the distance is equal to or less than the predetermined value, the travel control unit 3 corrects the host-vehicle track 30a to the host-vehicle track 30b in which the distance between the host-vehicle track 30 and the second other vehicle track 32 becomes longer than the predetermined value. The travel control unit 3 causes the host-vehicle 20 to be travelled along the corrected host-vehicle track 30b. This can reduce a risk of contact between the second other vehicle 22 and the host-vehicle 20.

(Seventh Traveling Scene)

Figure 5B:
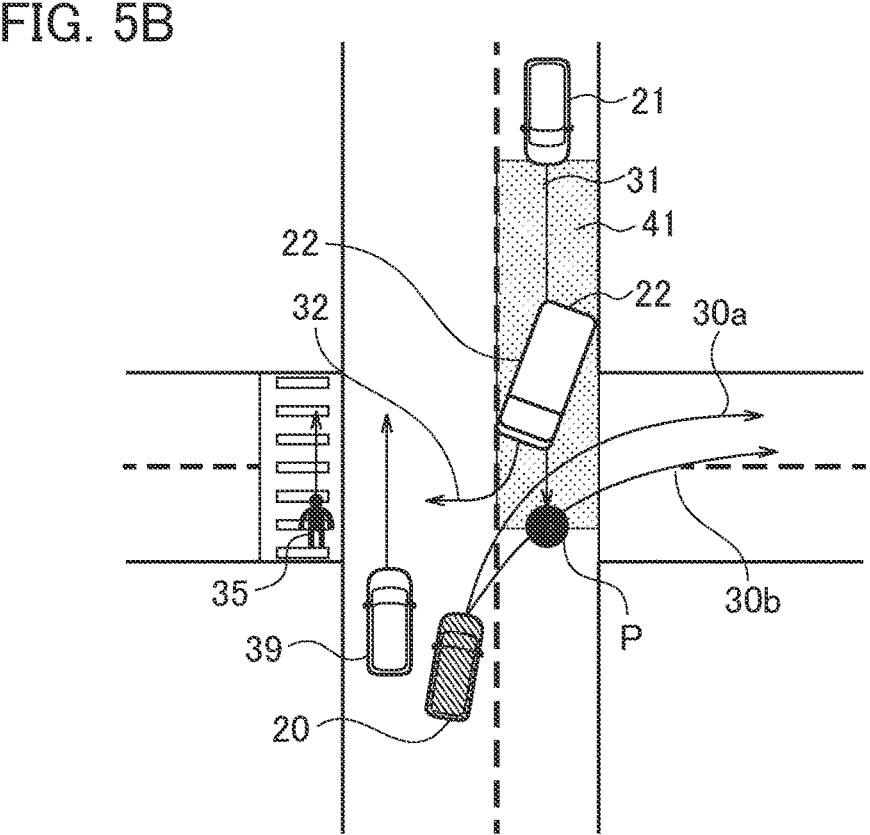
FIG. 5B a top view illustrating a seventh traveling scene.

FIG. 5B is a top view illustrating a seventh traveling scene. In the seventh traveling scene also, as similar to the sixth traveling scene, to eliminate a risk of contact between the second other vehicle 22 and the host-vehicle 20, the host-vehicle track 30a is corrected such that the distance between the host-vehicle track 30 and the second other vehicle track 32 becomes longer than the predetermined value.

The host-vehicle 20 sets a route of turning right at the intersecting point. The first other vehicle 21 travels on the opposite lane of the same road as the host-vehicle 20 toward the intersecting point. The first other vehicle 21 is predicted to travel on the first other vehicle track 31 that goes straight through the intersecting point. A third other vehicle 39 travelling parallel with the host-vehicle 20 approaches the intersecting point and a pedestrian 35 is walking on a pedestrian crosswalk. The second other vehicle 22 travels on the same lane as the first other vehicle 21 while traveling in front of the first other vehicle 21. The second other vehicle 22 takes a course 32 of turning right at the intersecting point. The pedestrian 35 is on the pedestrian crosswalk on the course 32. Further, the third other vehicle 39 travels on an opposite lane on the course 32. For this reason, the second other vehicle 22 needs to stop temporarily in the intersecting point. While the second other vehicle 22 temporarily stops, as illustrated in FIG. 5B, the second other vehicle 22 keeps shielding the first other vehicle track 31. Therefore, the shielding time estimating unit 14 predicts the shielding time based on obstacles (the pedestrian 35 and the third other vehicle 39) that obstruct the course 32 of the second other vehicle 22.

If it is determined that the host-vehicle 20 can enter the intersecting point (an intersecting point), the travel control unit 3 determines whether the distance between the second other vehicle track 32 and the host-vehicle track 30a is equal to or less than the predetermined value. If it is determined that the distance is equal to or less than the predetermined value, the travel control unit 3 corrects the host-vehicle track 30a to the host-vehicle track 30b in which the distance between the host-vehicle track 30 and the second other vehicle track 32 becomes longer than the predetermined value. The travel control unit 3 causes the host-vehicle 20 to be travelled along the corrected host-vehicle track 30b. This can reduce a risk of contact between the second other vehicle 22 and the host-vehicle 20.

Note that the above described embodiments are merely an example of the present invention. For this reason, the present invention is not limited to the above described embodiments, and even in forms other than the above described embodiments, it is needless to say that various modifications are possible according to designs and the like within a scope not departing from a technical idea according to the present invention.

REFERENCE SIGNS LIST

2 Controller (Driving support device)
20 Host-vehicle
21, 21a, 21b, and 21c First other vehicles
22, 22a, 22b, 22c Second other vehicle
30, 30a, 30b Host-vehicle track
31, 31a, 31b, 31c First other vehicle track
32 Second other vehicle track
35, 39 Obstacle
D1 Lane width of lane on which first other vehicle travels
D2 Lane width of lane on which second other vehicle travels L1 Vehicle body length of second other vehicle in traveling direction
P, P1, P2, P3 Intersecting point
Tab Shielding time
Tabp Arrival time
Tm Margin time
Tp Required entry time

The invention claimed is:

1. A driving support method for supporting driving of a host-vehicle in a traveling scene in which a host-vehicle track that is a track on which the host-vehicle travels and a first other vehicle track that is a track on which a first other vehicle travels intersect with each other at an intersecting point and a second other vehicle that is different from the first other vehicle arrives at a point faster than the first other vehicle, the point being a point on the first other vehicle track until the first other vehicle arrives at the intersecting point and being a point at which the first other vehicle track and a second other vehicle track that is a track on which the second other vehicle travels intersect with each other, the driving support method comprising:
   determining whether the host-vehicle can enter the intersecting point based on a shielding time that is a time during which the second other vehicle shields the first other vehicle track to the intersecting point and a required entry time that is a time from when the host-vehicle starts entering the intersecting point to when the host-vehicle finishes entering the intersecting point; and
   based on a determination of whether the host-vehicle can enter the intersecting point, controlling, by a controller, at least one system of the host-vehicle.

2. The driving support method according to claim 1 comprising:
   determining that the host-vehicle can enter the intersecting point in a case where the shielding time is longer than the required entry time.

3. The driving support method according to claim 1, comprising:
   predicting an arrival time that is a time until the first other vehicle arrives at the intersecting point based on the shielding time; and
   determining that the host-vehicle can enter the intersecting point in a case where a total time obtained by adding a predetermined margin time to the arrival time is longer than the required entry time.

4. The driving support method according to claim 1, comprising:
   predicting the shielding time by using a vehicle body length of the second other vehicle in a traveling direction, a lane width of a lane on which the first other vehicle travels, and a lane width of a lane on which the second other vehicle travels.

5. The driving support method according to claim 1, comprising:
   predicting the shielding time based on an obstacle that obstructs a course of the second other vehicle.

6. The driving support method according to claim 1, comprising:
   determining that the host-vehicle can enter the intersecting point after the second other vehicle starts shielding the first other vehicle track.

7. The driving support method according to claim 6, wherein
   the host-vehicle starts travelling when the second other vehicle starts shielding the first other vehicle track and when it is determined that the host-vehicle can enter the intersecting point.

8. The driving support method according to claim 1, wherein
   a priority order of the first other vehicle that enters the intersecting point is higher than a priority order of the host-vehicle that enters the intersecting point.

9. The driving support method according to claim 1, wherein
   the second other vehicle track is spaced apart from the host-vehicle track.

10. The driving support method according to claim 9, wherein
    in a case where a distance between the second other vehicle track and the host-vehicle track is equal to or less than a predetermined value, the host-vehicle track is corrected so that the distance becomes longer than the predetermined value.

11. The driving support method according to claim 1, wherein the at least one system of the host vehicle is an actuator or a notification device.

12. A driving support device that supports driving of a host-vehicle in a traveling scene in which a host-vehicle track that is a track on which the host-vehicle travels and a first other vehicle track that is a track on which a first other vehicle travels intersect with each other at an intersecting point and a second other vehicle that is different from the first other vehicle arrives at a point faster than the first other vehicle, the point being a point on the first other vehicle track until the first other vehicle arrives at the intersecting point and being a point at which the first other vehicle track and a second other vehicle track that is a track on which the second other vehicle travels intersect with each other,
   wherein whether the host-vehicle can enter the intersecting point is determined based on a shielding time that is a time during which the second other vehicle shields the first other vehicle track to the intersecting point and a required entry time that is a time from when the host-vehicle starts entering the intersecting point to when the host-vehicle finishes entering the intersecting point, and
   wherein the host-vehicle is controlled by a controller based on a determination of whether the host-vehicle can enter the intersecting point.

* * * * *